United States Patent [19]
Johnson

[11] 3,770,956
[45] Nov. 6, 1973

[54] X-RAY MEASURING GRID

[75] Inventor: E. Curtis Johnson, Mahtomedi, Minn.

[73] Assignee: Buckbee-Mears Company, Saint Paul, Minn.

[22] Filed: Dec. 30, 1971

[21] Appl. No.: 214,128

[52] U.S. Cl. .................................................. 250/59
[51] Int. Cl. ........................................... G01b 15/00
[58] Field of Search .................... 250/59, 65 R, 62, 250/63

[56] References Cited
UNITED STATES PATENTS
2,141,193   12/1938   Mott .................................... 250/59

*Primary Examiner*—William F. Lindquist
*Attorney*—Marvin Jacobson et al.

[57] ABSTRACT

A precision metal grid encapsulated in plastic for blocking X-rays in a coordinate pattern during exposure of X-ray film.

1 Claim, 5 Drawing Figures

PATENTED NOV 6 1973 3,770,956

3,770,956

X-RAY MEASURING GRID

BACKGROUND OF THE INVENTION

In the medical arts, X-ray pictures have proven to be an extremely useful tool for viewing and analyzing otherwise concealed internal features of human anatomy. Many other arts such as metal flaw analysis make use of X-ray exposures as well but the present invention, although useful in these other arts, is discussed with respect to the medical field since this constitutes an important use of X-ray pictures. The taking of an X-ray picture usually involves generating X-rays which pass through the object to be examined to impinge upon a suitable film which is sensitive to the X-rays. The relative density of the intervening tissues blocks more or less X-rays so as to provide a shadow-like picture of the internal tissue structure. Details, such as tumors or cavities in teeth, can be quite difficult to locate precisely due to the vague outlines of the various parts of the tissue and the inherent variation encountered with every different person studied. It would, of course, be highly desirable to provide an accurate measurement system wherein the exact position of the various internal details could be established with certainty. The present invention accomplishes this end.

SUMMARY OF THE INVENTION

My invention contemplates positioning a coordinate representing grid in front of the X-ray film which grid is opaque to X-rays so as to generate a corresponding grid or coordinate pattern on the X-ray film during exposure. To be useful, the grid must be very accurately sized and be comprised of extremely fine, precisely spaced lines. Such a grid is, of course, very fragile and delicate making its construction and handling virtually impossible were it not for the principles of my invention. I propose to produce the grid according to the photo fabrication principles of the metal finishing or electroforming arts wherein extreme dimensional accuracy and extreme minute detail are possible.

In the preferred embodiment the grid may be electrodeposited onto a base plate which may be produced by any of several methods well known to those in the printed circuit arts. For example, the base plate may be covered with a photosensitive resist and an image of the grid developed thereon by exposure to a suitable photographic master. An X-ray opaque metal is then electrodeposited on to the base plate. Plastic is laminated over the grid so as to encapsulate and protect the grid structure. The grid and plastic combination can then be peeled from the base plate and additional layers of plastic added to totally enclose and protect the grid. In this way, a grid of extemely fine lines may be produced in which the lines or wires are uniformly spaced at accurately predetermined locations. In addition, the grid may be readily handled due to its complete protection and encapsulation with plastic. It may therefore be seen that it is an object of my invention to provide a dimensionally accurate X-ray blocking grid encapsulated in a protective material for making accurate measurement possible during X-ray exposures. Further objects and advantages will become apparent upon consideration of the following description and drawings.

DESCRIPTION OF THE PREFERRED EMBODIMENT

Figure 1:
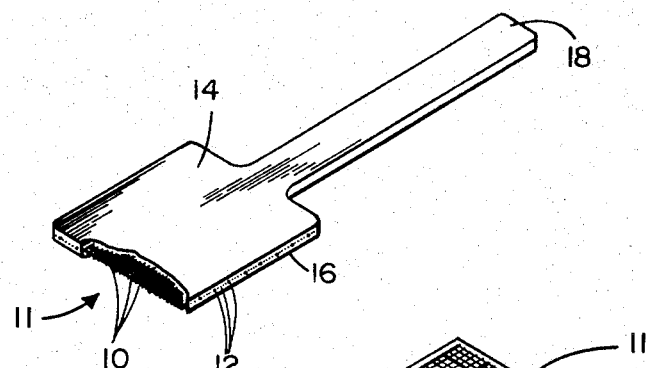
FIG. 1 is a perspective partially cut away view of the grid on my invention encapsulated in plastic and provided with a suitable handle.
Figure 2:
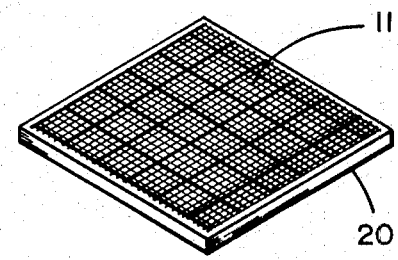
FIGS. 2, 3, 4 and 5 show the subsequent steps which may be used to produce the preferred embodiment of the invention.
Figure 3:
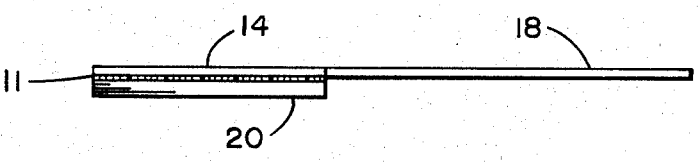
Figure 4:
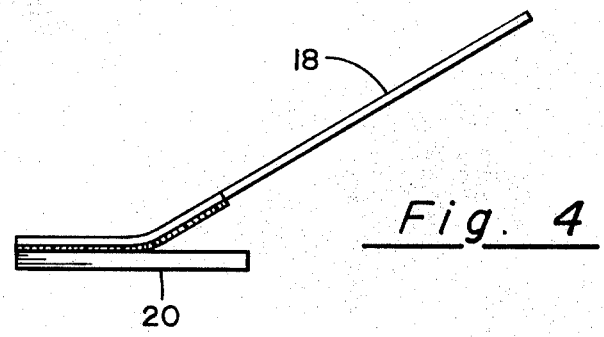
Figure 5:
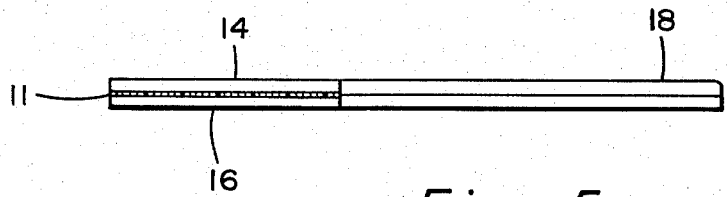

In FIG. 1, a partially cut away perspective view of the preferred embodiment of the present invention is shown. A grid generally indicated by the numeral 11 comprising two sets of perpendicular wires 10 and 12 is completely encapsulated by means of two layers of plastic 14 and 16. If desired, plastic layers 14 and 16 may be extended to form a handle portion 18. To produce the product of FIG. 1, the grid is electrodeposited onto a base 20 as shown in FIG. 2. Any suitable metal which is at least somewhat opaque to X-rays can be used. In one preferred embodiment a composition of about 60 percent tin, 40 percent lead was selected. In the pattern shown, every fifth line is made somewhat heavier than the others so that measurement is more easily effected. In FIG. 3, it may be seen how the plastic layer 14 is laminated directly onto the top of grid 11 so as to surround and partially encapsulate grid 11. Plastic layer 14 may be bonded to grid 11 by means of a suitable adhesive or it may comprise a chemically curing or a thermosetting plastic which is laminated onto and about grid 11. Plastic is not the only protective material that can be used to encapsulate grid 11, but it is preferred due to its ease of manufacture. Encapsulating layer 14 may have an extended portion shaped to form part or all of the handle 18. in FIG. 4 it may be seen that after the first layer of plastic is laminated into place, the grid and plastic combination may be easily peeled from base 20. In FIG. 5 an additional layer of plastic 16 is added to the opposite side of the grid 10 so as to totally encapsulate and protect the fine cross-wire construction. If desired, layer 16 may also have an extended portion so as to add to handle 18.

In use, the invention as shown in FIG. 1 may simply be inserted between the X-ray source and the film in close proximity to the film. As the X-ray exposure is produced, not only is a shadow image of the tissues produced but also a clear image of the dimensionally accurate grid which, in the final developed X-ray, makes it easier to locate, with great precision, any particular details made visible by the X-ray exposure.

I claim:

1. For use as a measuring grid in X-ray technology: a set of co-planar electrodeposited equally spaced thin cross-lines of X-ray opaque material; two layers of X-ray transparent material for encapsulating said set of cross-lines therebetween; and a handle attached to at least one of the encapsulating layers for moving the grid to position it with respect to the item being X-rayed.

* * * * *